J. KACEROVSKY.

Improvement in Friction-Pulleys.

No. 131,449.

Patented Sep. 17, 1872.

UNITED STATES PATENT OFFICE.

JOSEPH KACEROVSKY, OF BRIDGEPORT, CONNECTICUT, ASSIGNOR TO HIMSELF AND THE BELKNAP AND BURNHAM MANUFACTURING COMPANY, OF SAME PLACE.

IMPROVEMENT IN FRICTION-PULLEYS.

Specification forming part of Letters Patent No. 131,449, dated September 17, 1872.

*To all whom it may concern:*

Be it known that I, JOSEPH KACEROVSKY, of Bridgeport, in the county of Fairfield and State of Connecticut, have invented a new and useful Improvement in Friction-Pulleys; and I do hereby declare that the following is a full, clear, and exact description of the same, reference being had to the accompanying drawing forming part of this specification, and in which—

Figure 2:
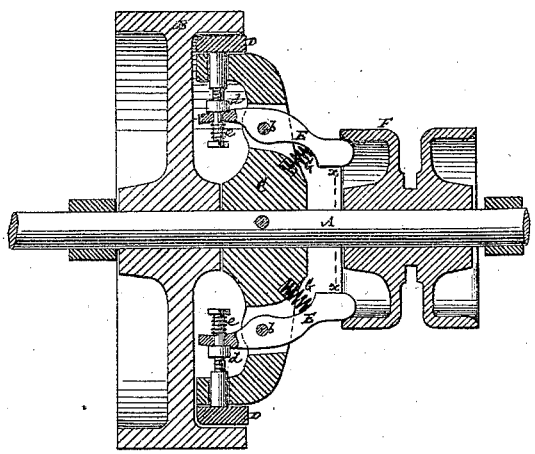
Figure 1:
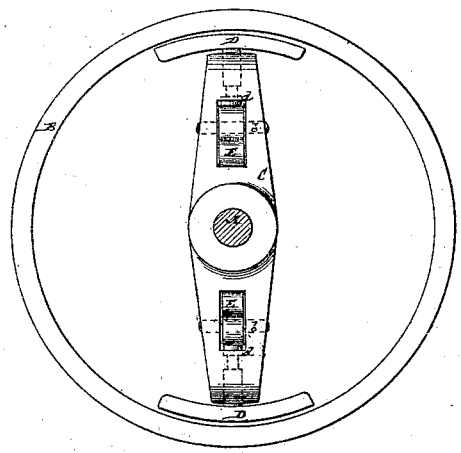

Figure 1 represents a face view of the pulley taken transversely through its shaft at $x\ x$, and having certain friction devices or attachments applied. Fig. 2 is a sectional view taken in direction of the length of the shaft.

Similer letters of reference indicate corresponding parts.

This invention consists in certain novel combinations of parts or devices, including levers having their fulcrums on a carrier fast to the shaft, and oparated by a sliding clutch to throw friction-drivers into contact with the pulley, subject to their return by springs, whereby very efficient and durable provision is made for connecting and disconnecting the pulley with its shaft, so as to rotate in common with it or to be loose thereon.

A is the shaft, on which the pulley B is fitted to run loosely. C is a carrier fast to the shaft, so as to revolve in common with it. This carrier serves to hold two or more friction-drivers, D D, which are fitted so as to be capable of sliding in or out relatively to the rim of the pulley and within it, for the purpose of establishing or breaking frictional connection between the pulley and the shaft. E E are levers having intermediate fulcrums $b\ b$ on or in the carrier C, in transverse relation as it were with the shaft. The outer ends of these levers are bent or rounded off, so that when a hollow annular or rim clutch, F, fitted loosely on the shaft, is slid inward toward the pulley, the interior of the rim of the clutch, that should be made beveling or flaring at its mouth, bears on the bent or rounded outer ends of the levers to force them inward toward the shaft, and to give a corresponding outward action to the inner ends of the levers, for the purpose of thrusting the friction-drivers D D against the interior of the rim of the pulley and thereby causing the pulley and shaft to rotate in common. Springs G G operate to return the levers E E to their normal position, when the clutch F is slid back and relieved from pressing on the outer ends ot the levers to release the friction-drivers D D from bearing on the rim of the pulley and liberating the pulley from driving connection with the shaft. By the construction of the clutch F and outer ends of the levers E E, as described, there are no sharp points of contact to produce rapid wear consequent on putting the pulley in and out of driving connection with its shaft. The inner ends of the levers E E may be connected with the friction-drivers D D by passing the shanks of the latter loosely through the levers, and fitting said shanks on the outside of the levers with adjusting-nuts $d\ d$, for the levers to thrust outward on the friction-drivers, and to provide for the adjustment from time to time, or as required, of the friction-drivers relatively to the rim of the pulley. Springs $e\ e$, arranged around the inner ends of the shanks of the friction-drivers, between collars on the shanks and the inside of the levers, serve to insure the return of the friction-drivers away from the rim of the pulley when the clutch F is slid to release the levers E E from outward thrust on said drivers. The clutch F may be made double—that is, alike on both faces—so that on arranging upon the shaft a second loose pulley traveling in a reverse direction to the first pulley, and providing it with devices, as described, for putting it into or out of driving connection with the shaft, the latter may be rotated in reverse directions by simply sliding the clutch F to the right or to the left along the shaft.

What is here claimed, and desired to be secured by Letters Patent, is—

1. The levers E E, having their fulcrums on the carrier C fast to the shaft A, in combination with the friction-drivers D D, the pulley B, the sliding annular clutch F, and the springs G G, substantially as specified.

2. The combination of the adjusting-nuts $d\ d$ and springs $e\ e$ with the friction-drivers D D and their operating levers E E, essentially as described.

JOSEPH KACEROVSKY.

Witnesses:
W. A. PARROTT,
C. W. McCORD.